United States Patent
Brandt

(10) Patent No.: US 9,201,514 B1
(45) Date of Patent: Dec. 1, 2015

(54) JOYSTICK GRIP WITH INTEGRATED DISPLAY

(75) Inventor: Jacob E. Brandt, Delano, MN (US)

(73) Assignee: Danfoss Power Solutions Inc., Ames, IA (US)

( * ) Notice: Subject to any disclaimer, the term of this patent is extended or adjusted under 35 U.S.C. 154(b) by 600 days.

(21) Appl. No.: 12/252,429

(22) Filed: Oct. 16, 2008

(51) Int. Cl.
*G06F 3/033* (2013.01)
*G06F 3/0338* (2013.01)
*G05G 9/047* (2006.01)

(52) U.S. Cl.
CPC .............. *G06F 3/0338* (2013.01); *G05G 9/047* (2013.01)

(58) Field of Classification Search
USPC ....... 345/157–178; 180/332–334; 74/471 XY
See application file for complete search history.

(56) References Cited

U.S. PATENT DOCUMENTS

| | | | |
|---|---|---|---|
| 3,662,973 A * | 5/1972 | Paine et al. | 244/23 A |
| 4,687,072 A * | 8/1987 | Komuro | 180/219 |
| 5,373,317 A | 12/1994 | Salvati et al. | |
| 5,685,776 A | 11/1997 | Stambolic et al. | |
| 5,759,100 A | 6/1998 | Nakanishi | |
| 5,893,798 A | 4/1999 | Stambolic et al. | |
| D411,530 S | 6/1999 | Carter et al. | |
| 5,995,104 A * | 11/1999 | Kataoka et al. | 715/848 |
| 6,001,015 A | 12/1999 | Nishiumi et al. | |
| 6,248,017 B1 | 6/2001 | Roach | |
| 6,332,840 B1 | 12/2001 | Nishiumi et al. | |
| 6,524,188 B2 | 2/2003 | Wang | |
| 6,540,614 B1 | 4/2003 | Nishino et al. | |
| 6,550,562 B2 | 4/2003 | Brandt et al. | |
| 6,773,349 B2 | 8/2004 | Hussaini et al. | |
| 6,859,198 B2 | 2/2005 | Onodera et al. | |
| 7,003,381 B2 | 2/2006 | Wakefield, II | |
| 7,109,994 B2 | 9/2006 | Bollo et al. | |
| 7,334,658 B2 * | 2/2008 | Berg et al. | 180/333 |
| 7,668,634 B2 * | 2/2010 | Mansell et al. | 701/36 |
| 2002/0171559 A1 * | 11/2002 | Yang | 340/825.69 |
| 2003/0130036 A1 | 7/2003 | Hsu | |
| 2003/0220142 A1 | 11/2003 | Siegel | |
| 2004/0229695 A1 | 11/2004 | Hussaini et al. | |
| 2005/0019722 A1 | 1/2005 | Schmid et al. | |
| 2005/0164789 A1 | 7/2005 | Nakamura et al. | |
| 2006/0007144 A1 * | 1/2006 | Mathiasen et al. | 345/161 |
| 2006/0281453 A1 * | 12/2006 | Jaiswal et al. | 455/423 |
| 2007/0056780 A1 * | 3/2007 | Jaenke et al. | 180/65.1 |
| 2007/0123351 A1 * | 5/2007 | Cheng et al. | 463/38 |
| 2008/0235965 A1 * | 10/2008 | Jaiswal et al. | 33/366.11 |
| 2008/0252600 A1 * | 10/2008 | Hagner et al. | 345/161 |
| 2009/0062995 A1 * | 3/2009 | Unno | 701/51 |
| 2009/0278819 A1 * | 11/2009 | Goldenberg et al. | 345/184 |

FOREIGN PATENT DOCUMENTS

DE 196 04 351 8/1997

* cited by examiner

*Primary Examiner* — Dmitriy Bolotin
(74) *Attorney, Agent, or Firm* — Zarley Law Firm, P.L.C.

(57) ABSTRACT

A joystick for operating heavy machinery. The joystick has a base assembly and a grip assembly wherein a display is integrated into the first end of the grip assembly and the second end is pivotably mounted within the base assembly. Movement of the grip assembly relative to the base assembly moves an actuating assembly of the heavy machinery wherein the display is able to provide useful information to the user during operation.

2 Claims, 3 Drawing Sheets

JOYSTICK GRIP WITH INTEGRATED DISPLAY

BACKGROUND OF THE INVENTION

The present invention relates to control devices. More specifically, a joystick device for controlling heavy machinery.

Joysticks are used in heavy machinery such as backhoes, skid steer loaders and the like in order to operate actuating members such as hydraulic cylinders and lift arms that are used to lift a work bucket or the like. Typically these joysticks comprise a grip assembly that is pivotably mounted to a base assembly wherein the joystick moves the actuating member dependent upon the movement of the grip assembly relative to the base assembly.

Presently in the art in order to operate an actuating member an individual must concentrate on the joystick and actuating member at the same time in order to provide desired operation. This becomes extremely difficult when the actuating member needs to be moved during times when the heavy machinery traverses across the ground. Additionally, determining when an actuating member, such as a bucket or the like is at a level position is difficult to determine by merely using ones sight. Therefore, a need exists for a joystick that can provide a user with information that can be used during operating processes to facilitate the operation of the machinery.

Therefore, a principal object of the present invention is to provide a joystick that provides information to a user.

Yet another object of the present invention is to provide a joystick that enhances user control.

These and other objects, features, or advantages of the present invention will become apparent from the specification and claims.

BRIEF SUMMARY OF THE INVENTION

A joystick for operating heavy machinery. The joystick has a base assembly and a grip assembly wherein the grip assembly extends from a first end to a second end that is pivotably connected to the base assembly. A display is integrated into the grip assembly for providing user information. Movement of the grip assembly relative to the base assembly moves an actuating member of the heavy machinery wherein a user can use the information provided on the display during the operating process.

DETAILED DESCRIPTION OF THE PREFERRED EMBODIMENT

Figure 1:
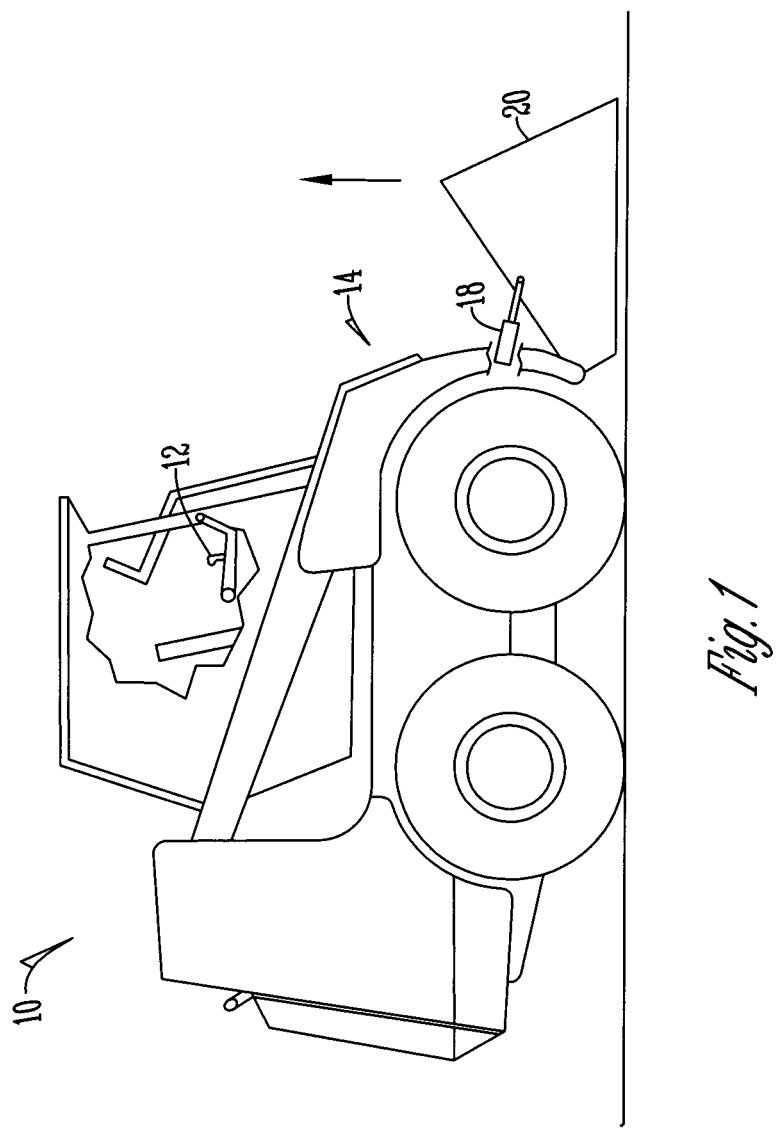
FIG. 1 is a side plan view of heavy machinery having joystick.
Figure 3:
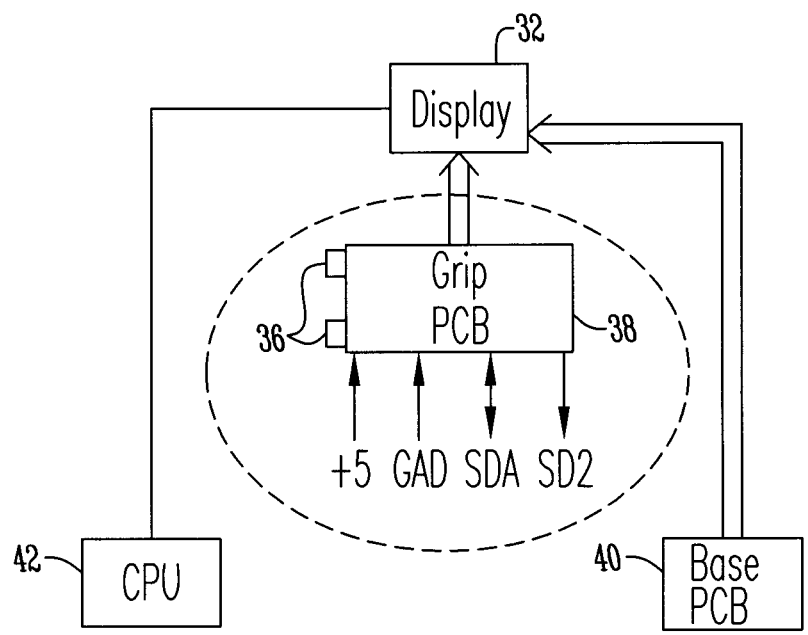
FIG. 3 is a schematic diagram of a control system for a joystick.

FIG. 1 shows one example of heavy machinery 10 that utilizes a joystick 12 that is used to control an actuating assembly 14 via a control system 16 (FIG. 3). While the actuating assembly 14 in FIG. 1 is shown as hydraulic cylinders 18 used to lift and actuate bucket 20, any actuating member on heavy machinery controlled by a joystick 12 is contemplated by this disclosure. Similarly, while FIG. 1 shows the heavy machinery 10 as a skid steer loader all types of heavy machinery are contemplated that utilize a joystick 12 including but not limited to a steer skid loader, backhoe, forklift, and the like.

Figure 2:
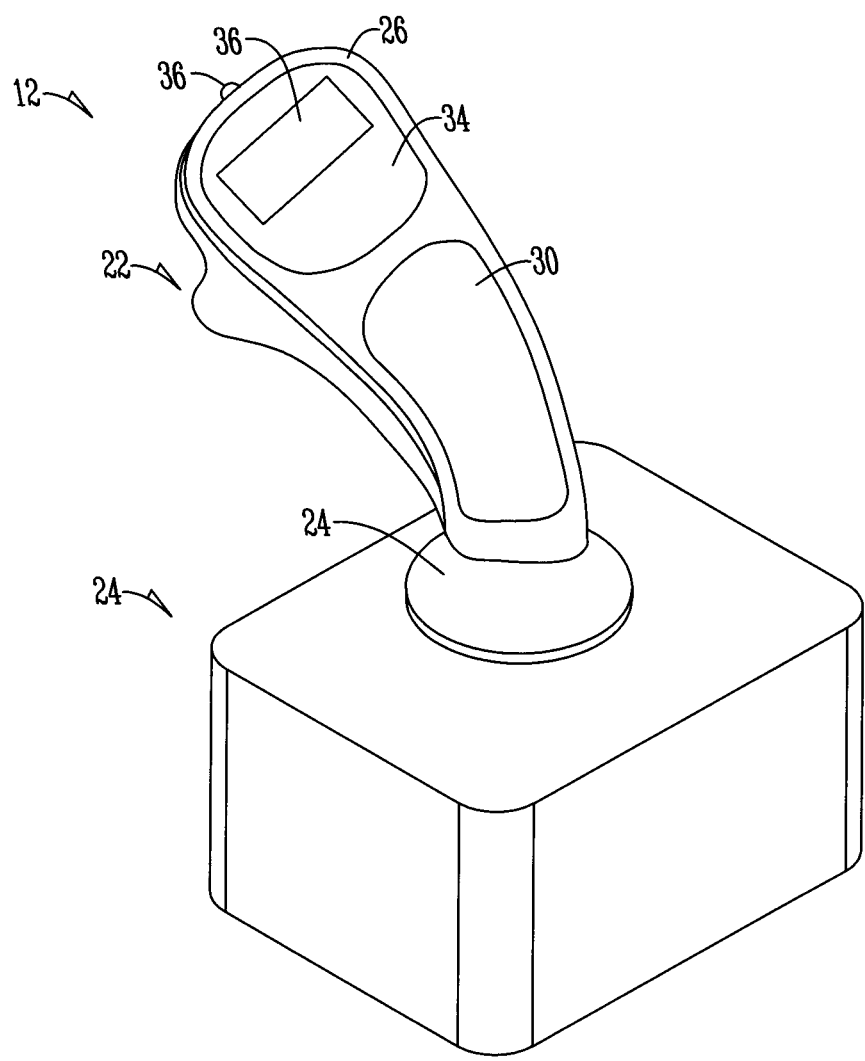
FIG. 2 is a perspective view of a joystick.

FIG. 2 shows the joystick 12. Joystick 12 has a grip assembly 22 that is pivotably connected to a base assembly 24. The grip assembly 22 extends from a first end 26 to a second end 28. The second end 28 is pivotably received by the base assembly 24. The grip assembly 22 is contoured to accommodate the grip of a user and can have a recessed or padded area 30 disposed therein.

Integrated into the grip assembly 22 is a display 32. In a preferred embodiment the display 32 is a liquid crystal display (LCD). Specifically, types of LCDs include color super twisted nematic (CSTN) displays, Thick film transistor (TFT) displays and chip on glass (COG) displays. Alternatively the display 32 could be a touch sensitive quantum tunneling composite (QTC), an organic light emitting diode (OLED), a field emission display (FED), a liquid crystal on silicon (LCOS) display, a plasma display panel (PDP), a surface-conduction electron-emitter display (SED), a vacuum fluorescent display (VFD), or the like.

In the embodiment shown in FIG. 2 the display 32 is located at the first end 26 of the grip assembly 22 in an arcuate angled surface 34 that angles the display 32 towards a user. Also, by having the display 32 at the first end 26 of the grip assembly 22 a user can place their hand around the grip assembly 22 grasping the recessed padded area 30 without covering the display 32 with their hand or fingers. The grip assembly 22 also has a plurality of buttons 36 that provide for different functions while operating the heavy machinery 10.

FIG. 3 shows a schematic diagram of the control system 16 of controller 12. As shown, the grip assembly 22 has a grip printed circuit board (PCB) 38 that is electrically connected to the display 32 for electronic communication. Specifically, the grip assembly PCB 38 can provide information such as button status or function, joystick x/y position and false or errors within the system 16. Thus, the display 32 is able to display button status or function, joystick x/y position and fault and error messages to a user.

Additionally, electrically connected to the display 32 is a base assembly printed circuit board (PCB) 40 that is part of the based assembly 24. By being electrically connected to the display 32 the base PCB 40 can provide information to the display 32 regarding joystick x/y position and fault or error information. Thus, the display 32 is able to display x/y position and fault or error messages to a user.

Also electrically connected to the display 32 is a central processing unit 42. The central processing unit 42 is able to provide information regarding the heavy machinery. For example, information regarding the heavy machinery's RPMs, speed or the like can be sent from the central processing unit 42 to the display 32 for viewing. Thus, once again a user can read the displayed information in order to more precisely and accurately control the actuating assembly 14. Preferably the central processing unit 42 is a CAN node that is able to provide information from other sources on a CAN bus.

Thus, disclosed in an improved joystick 12 that has an integrated display 32. By utilizing the display 32 information can be passed to a user such as the speed and RPM of the heavy machinery 10, joystick x/y position and fault or error information to help facilitate the operation of the actuating assembly 14. By having this information readily available at the joystick 12 a user more conveniently and safely uses the actuating assembly. Additionally, by placing the display 32 at the first end 26 of the grip assembly 22 within an arcuate angled section 34 the screen 32 is easy to see by a user thus maximizing use of the display 32 to facilitate working conditions. Thus, at the very least all of the stated objectives have been met.

It will be appreciated by those skilled in the art that other various modifications could be made to the device without departing from the spirit and scope of this invention. All such modifications and changes fall within the scope of the claims and are intended to be covered thereby.

What is claimed is:

1. A joystick for operating heavy machinery comprising:
a base assembly having a first printed circuit board therein;
a grip assembly extending from a first end to a second end that is pivotably connected to the base assembly;
said grip assembly having a second printed circuit board therein wherein movement of the grip assembly relative to the base assembly moves an actuating assembly of the heavy machinery;
a display integrated in a surface of the grip assembly and electrically connected to the first and second printed circuit boards to provide a user with information related to the base assembly and grip assembly;
wherein the grip assembly has a plurality of buttons and the second printed circuit board provides information to the display such that the display displays button status information, button function information, joystick position information and fault and error messages to the user; and
wherein the first printed circuit board provides information to the display such that the display displays joystick position information and fault and error messages to the user provided to the display by the first printed circuit board.

2. The joystick of claim 1 further comprising a control processing unit electrically connected to the display wherein the control processing unit provides information to the display such that the display displays information regarding the heavy machinery including heavy machinery RPM's and speed to the user provided to the display by the control processing unit.

* * * * *